Patented Nov. 4, 1930

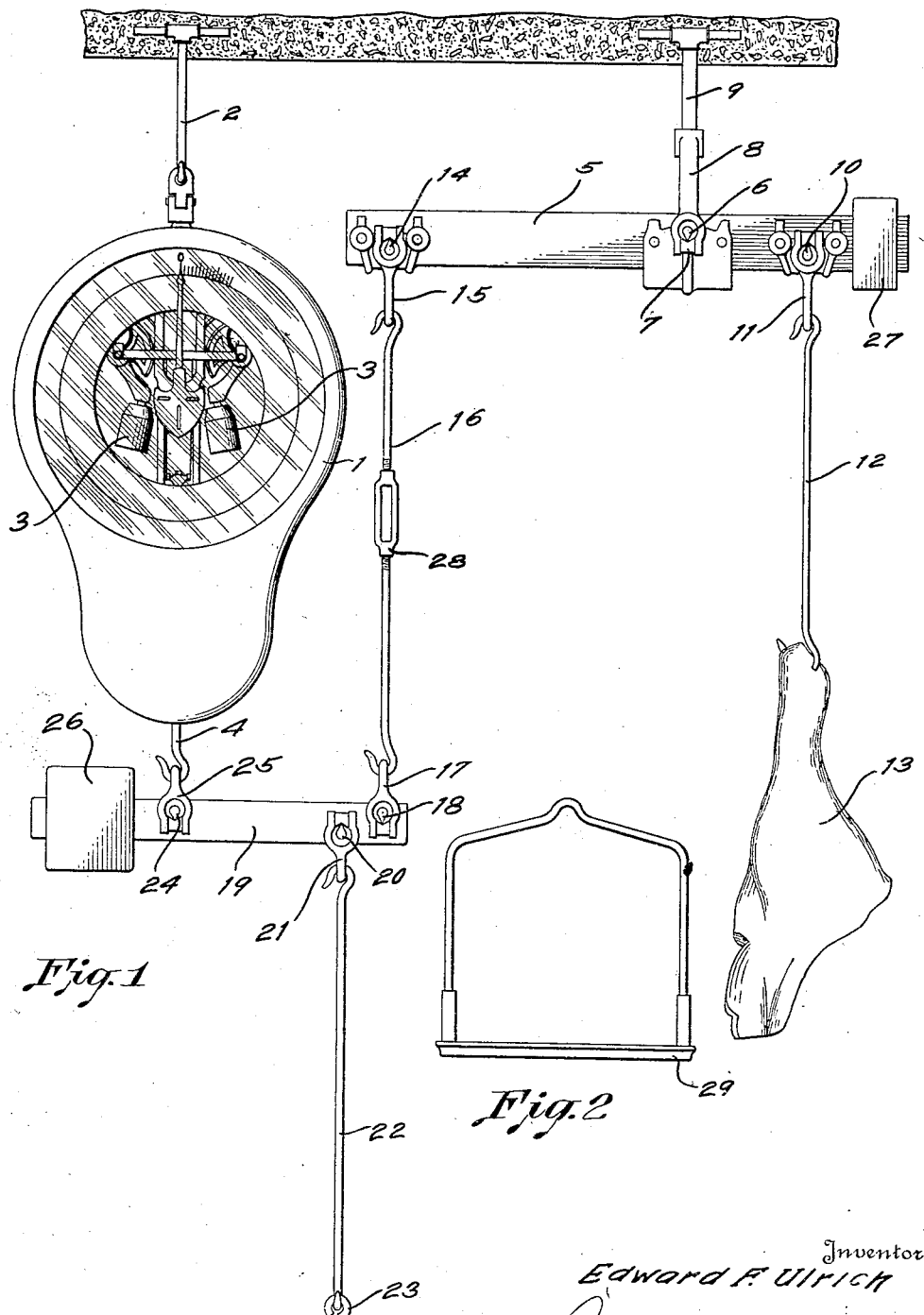

1,780,411

UNITED STATES PATENT OFFICE

EDWARD F. ULRICH, OF TOLEDO, OHIO, ASSIGNOR TO TOLEDO SCALE COMPANY, OF TOLEDO, OHIO, A CORPORATION OF NEW JERSEY

WEIGHING SCALE

Application filed October 18, 1926. Serial No. 142,203.

This invention relates to weighing scales, and particularly to a scale adapted for use in weighing either bulky commodities which by reason of their size and shape it is desirable to weigh while suspended, or smaller commodities such as may be conveniently weighed upon a platter. More specifically, it is an object of the invention to provide a scale for use in butcher shops adapted for weighing cuts of meats in the ordinary course of trade and capable of being arranged to weigh quarters and other large portions of meat and hence capable of use as a weighing-in or receiving scale.

Another object is the provision of a system of levers which may be readily connected to a scale of the hanging type, to adapt the scale for the weighing of bulky commodities, without necessitating any difficult adjustment of the scale mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale embodying my invention, showing the mechanism arranged for weighing bulky commodities;

Figure II is an elevational view of a commodity-receiving pan adapted to replace the lever mechanism when the scale is to be arranged for weighing small commodities.

Referring to the drawings in detail, the load-counterbalancing mechanism is enclosed in a pear-shaped housing 1 which is shown as suspended from the ceiling by means of a hook 2. The load-counterbalancing mechanism consists of a pair of pendulums 3 which swing outwardly and upwardly to counterbalance the weight of any load placed on the hook 4 which projects from the lower end of the scale. In the arrangement shown in Figure I, a lever 5 of the first order is fulcrumed by means of a fulcrum pivot 6 upon a bearing 7 supported in the stirrup 8 which is suspended from the ceiling by means of a rod 9. Fixed to the lever 5 adjacent one end thereof is a load pivot 10 from which are hung a stirrup 11 and a hook rod 12 for supporting a commodity, such as 13. At the other end of the lever is fixed a nose pivot 14 from which is suspended a stirrup 15. The stirrup 15 is connected by means of a two-part rod 16 to a stirrup 17 which pulls upwardly upon a load pivot 18 fixed in a second lever 19. The lever 19 is fulcrumed by means of a fulcrum pivot 20 in a stirrup 21 connected by means of a rod 22 to an eye 23 fixed in the floor, and the nose pivot 24 of the lever 19 is connected by means of a stirrup 25 to the hook 4 which projects from the lower end of the scale housing 1. Balance weights 26 and 27 are provided for the purpose of insuring proper seating of the pivots and bearings and holding the levers in horizontal position when there is no load upon the hook rod 12, and in order that the scale may be quickly balanced the weights 26 and 27 are made slidable upon the levers 19 and 5. The two-part rod 16 is also made adjustable in length by means of a turn buckle 28.

When it is desired to use the scale for weighing cuts of meat or other light commodities, the levers 5 and 19 and the rods connected thereto are removed and the pan 29 is hung directly from the hook 4. The capacity of the scale with the pan 29 hung from the hook 4 may conveniently be 50 lbs. The multiplication of the levers 19 and 5 may be 10 to 1, so that the capacity of the scale with the levers 5 and 19 attached will be 500 lbs. The scale is thus available for use in the comparatively infrequent weighing-in of quarters and other large pieces of meat, as well as for use in the ordinary course of trade.

The embodiment of my invention herein shown and described is to be regarded as illustrative only, and it is to be understood that the invention is susceptible to variation, modification and change within the spirit and scope of the subjoined claims.

Having described my invention, I claim:
1. In a device of the class described, in combination, a hanging scale, said scale having a removable pan, lever mechanism adapted to be incorporated with said scale in substitution for said pan, said lever mechanism comprising a horizontal lever, means for connecting said horizontal lever to said scale at the point of connection for said pan and for connecting said lever to the floor, a second horizontal lever, means for connecting said second horizontal lever to the ceiling and to the first said lever, a commodity-receiver suspended from said second horizontal lever, and an adjustable balance weight on the first said horizontal lever.

2. In a device of the class described, in combination, a hanging scale, said scale having a removable pan, lever mechanism adapted to be incorporated with said scale in substitution for said pan, said lever mechanism comprising a horizontal lever, means for connecting said horizontal lever to said scale at the point of connection for said pan and for connecting said lever to the floor, a second horizontal lever, means for connecting said second horizontal lever to the ceiling and to the first said lever, a commodity-receiver suspended from said second horizontal lever, and adjustable balance weights on said horizontal levers.

EDWARD F. ULRICH.